US007334725B2

(12) United States Patent
Dan

(10) Patent No.: US 7,334,725 B2

(45) Date of Patent: Feb. 26, 2008

(54) FLASH MEMORY DEVICE WITHIN A BUSINESS CARD

(75) Inventor: Raz Dan, San Jose, CA (US)

(73) Assignee: San Disk IL Ltd., Kfar Saba (IL)

( * ) Notice: Subject to any disclaimer, the term of this patent is extended or adjusted under 35 U.S.C. 154(b) by 0 days.

(21) Appl. No.: 11/444,385

(22) Filed: Jun. 1, 2006

(65) Prior Publication Data

US 2006/0273154 A1 Dec. 7, 2006

Related U.S. Application Data

(60) Provisional application No. 60/686,013, filed on Jun. 1, 2005.

(51) Int. Cl.
*G06K 5/00* (2006.01)
*G06K 19/06* (2006.01)

(52) U.S. Cl. ...................................... 235/380; 235/492

(58) Field of Classification Search ................ 235/380, 235/492

See application file for complete search history.

(56) References Cited

U.S. PATENT DOCUMENTS 5,404,485 A 4/1995 Ban
6,148,354 A 11/2000 Ban
6,783,060 B2 8/2004 Marappan
6,883,718 B1 * 4/2005 Le et al. .................... 235/492
6,890,188 B1 * 5/2005 Le ........................... 439/76.1
2005/0109841 A1 * 5/2005 Ryan et al. ................ 235/380
2006/0118639 A1 * 6/2006 Kean et al. ................ 235/492
2006/0180674 A1 * 8/2006 Margalit et al. ........... 235/492
2006/0219776 A1 * 10/2006 Finn .......................... 235/380
2006/0255158 A1 * 11/2006 Margalit et al. ........... 235/492

FOREIGN PATENT DOCUMENTS

WO WO2005124932 12/2005

* cited by examiner

*Primary Examiner*—Michael G. Lee
*Assistant Examiner*—Tuyen Kim Vo
(74) *Attorney, Agent, or Firm*—Mark M. Friedman

(57) ABSTRACT

A flash memory device including a housing, having a form factor of a business card bearing printed information, a non-volatile memory within the housing, for storing digital information, and a connecting mechanism within the housing for a direct operational connection of the non-volatile memory to a host, such that the digital information stored in the non-volatile memory is accessible to the host via the connecting mechanism. At least one slit located within the housing provides a somewhat elastically bendable portion within the housing that includes the connecting mechanism. The scope of the invention also provides configuring the non-volatile memory to allow only an authorized party to access personal information stored in the non-volatile memory.

10 Claims, 4 Drawing Sheets

FLASH MEMORY DEVICE WITHIN A BUSINESS CARD

CROSS-REFERENCE TO RELATED APPLICATIONS

This patent application claims the benefit of U.S. Provisional Patent Application No. 60/686,013, filed Jun. 1, 2005.

FIELD OF THE INVENTION

The present invention relates to a portable flash memory device. More particularly, the present invention relates to a flash memory device used within a card, such as a business card.

BACKGROUND OF THE INVENTION

Business cards have been used as a printed introduction document for decades, wherein a 5 cm by 9 cm size business card is accepted as a standard size. Albums, holders, scanners, and other devices have been designed to accommodate cards of this size. The use of printed business cards is deeply entrenched in the business culture world-wide, and seemingly they have not disappeared with the mass introduction of digital alternatives. It is not conceivable that a business person will waive his printed business cards in favor of any digital alternative.

Digital business cards known in the art containing both printed and digital information have been introduced, as the owner of the business cards often wishes to provide, along with his business card, additional information, e.g. relating to his business or to other areas of interest. The digital information is stored on a compact disk (CD) that is cut to the size of a standard business card. Such a product is available from Amstore CD production Ltd, London, UK.

Prior art cards bearing printed and digital information are taught by U.S. Pat. No. 6,783,060 to Marappan and International Publication No. WO2005124932 to Atsmon et al.

The Marappan patent discloses a business card that contains printed textual information on the first side and magnetic media for storing electronic information on a second side. The second side contains all of the printed information displayed on the first side of the document. The business card also allows users to include additional information, such as attached files and hyperlinks, on the second side. To write and read to and from the business card, a reader/writer is disclosed to interface with a desktop computer.

However, the Marappan patent has a major disadvantage which limits its use. As clearly stated by the Marappan patent, a special card reader must be available in order to read this electronic information. In other words, the electronic information stored on the magnetic media of this business card can not be read by any standard computer or other mobile devices, such as a PDA (Personal Digital Assistant) mobile hand-held device or a cellular phone.

The Atsmon patent introduces a double-sided male USB connector and various card-shaped devices having one or more male USB connectors. The device can be manufactured from flexible material using a lamination process and may be configured to communicate with a broad variety of other electronic devices.

However, almost none of the embodiments taught by Atsmon comply with the dimensions of a standard rectangular business card form factor.

Furthermore, according to the Atsmon patent the flexible material of the card is employed only as a means for doubling the thickness of the card, so that the whole card bends and the effective thickness will provide the tolerance required for inserting the connector into the receptacle. These embodiments of the Atsmon patent clearly do not guarantee a well-defined electrical contact between the pins of the connector part and the leads of the receptacle. In reality, the part opposite the connector that bends upon the connector part will tend to elevate from the connector part, thus neutralizing the effective thickness required and disconnecting the leads of the receptacle from contacting the connector part.

The only embodiment in the Atsmon patent that is a rectangular card-shaped device with dimensions similar to those of a credit card is the embodiment of FIG. 17. However, the description of this embodiment in the Atsmon patent is not enabling, because there is no indication of the way in which the male USB connector of this embodiment is inserted into a USB female receptacle of a host.

Thus, it would be highly advantageous to provide an innovative business card bearing both printed information and digital information, of a standard size and thickness, configured to properly connect to a computing device for reading and updating the digital information, while overcoming disadvantages of prior art techniques.

SUMMARY OF THE INVENTION

Accordingly, it is a principal object of the present invention to overcome the disadvantages of prior art devices by introducing an innovative business card bearing both printed information and digital information, of a standard size and thickness that does not protrude from the dimensions of a standard business card form factor. The business card is configured to properly connect to a computing device for reading and updating the digital information without requiring a reader. A non-volatile memory is provided for storing digital information.

The present invention includes at least one slit creating an elastically bendable portion, such that only this bendable portion is elevated above the rest of the business card and is connected to a standard USB socket; such that the pressure applied by supporting upper body part and the lower body part of the business card maintains a proper connection.

In accordance with the present invention, there is provided a flash memory device including: (a) a housing having a form factor (i.e. physical size and shape) of a business card bearing printed information; (b) a non-volatile memory, within the housing, for storing digital information; and (c) a connecting mechanism, within the housing, for a direct operational connection of the non-volatile memory to the host, such that the digital information stored in the non-volatile memory is accessible to the host via this connecting mechanism (i.e. without requiring a reader).

Preferably, at least one slit is located within the housing to provide an elastically bendable portion within the housing, such that the elastically bendable portion includes the connecting mechanism. More preferably, the elastically bendable portion cooperates with a remainder of the housing to secure contact between the connecting mechanism and the host. Also more preferably, the connecting mechanism is a USB connector.

Preferably, the non-volatile memory is a NAND flash memory.

In accordance with the present invention, there is further provided a method for disseminating personal information, the method includes the steps of: (a) configuring a business card to include a non-volatile memory and a mechanism for directly operationally connecting the non-volatile memory to a host; (b) providing a first portion of the personal information on a surface of the business card; and (c) storing a second portion of the personal information in the non volatile memory to be accessible to the host upon directly operationally connecting the non-volatile memory to the host.

Preferably, the configuring step includes slitting the business card to form a somewhat elastically bendable portion of the business card that includes at least a portion of the mechanism.

In accordance with the present invention, there is provided a flash memory device including: (a) a housing having a form factor (i.e. physical size and shape) of a business card bearing printed information; (b) a non-volatile memory, within the housing, for storing digital information; and (c) at least one slit is located within the housing to provide a somewhat elastically bendable portion within the housing, such that the elastically bendable portion includes a connecting mechanism for directly operationally connecting the non-volatile memory to a host.

Preferably, the elastically bendable portion cooperates with a remainder of the housing to secure contact between the connecting mechanism and the host.

Preferably, the connecting mechanism is a USB connector.

Preferably, the non-volatile memory is a NAND flash memory.

In accordance with the present invention, there is further provided a method for disseminating personal information, the method includes the steps of: (a) printing a first portion of the personal information on a surface of a business card that includes a non-volatile memory; (b) storing a second portion of the personal information in the non volatile memory; and (c) slitting the business card to form a somewhat elastically bendable portion of the business card for directly operationally connecting the non-volatile memory to a host, such that the personal information in the non-volatile memory is accessible to the host by operationally connecting the elastic bendable portion directly to the host (i.e. without requiring a reader).

In accordance with the present invention, there is further provided a method for distributing personal information, the method includes the steps of: (a) storing the personal information in a non-volatile memory, of a memory device that has a form factor of a business card, to be accessible to a host upon a direct operational connection of the non-volatile memory to the host; and (b) configuring the non-volatile memory to allow only an authorized party to access the personal information.

Preferably, the method further includes the step of granting the authorized party a key to access, at least in part, the personal information.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF THE PREFERRED EMBODIMENTS

The present invention discloses an innovative flash memory device, such as a USB Flash Drive (UFD), used within a card having a form factor, i.e. physical size and shape, of a business card. The personal information stored in the card is to be accessible to a host and to a host user for reading and updating by a direct connection of the card to such host. In other words, connecting the card to a host computer is done without requiring a special card reader such as the magnetic card reader of Marappan.

The flash memory device of the present invention is used within a card that, when not in use, has the rectangular form factor of a standard business card, such that the flash memory device deviates from a standard business card form factor only when the card is directly connected to the host.

The flash memory device includes a non-volatile memory for storing digital information, such that the digital information can easily be written to, read from, and updated on a host. A UFD is known in the art of non-volatile memory devices, such as DiskOnKey®, available from M-Systems, Israel. The UFD can typically be connected to a host device (computer, PDA, Cellular phone etc.) by a USB connector, designed according to the USB specifications.

A controlling unit is provided for controlling the write and read operations of the digital data stored within the non-volatile memory. The controlling unit is connected via a connector to a standard USB socket for operationally connecting the non-volatile memory to a host and interfacing with the operating system of the host.

The typical dimensions of a business card widely used in the art are 5 cm by 9 cm in size and substantially 0.7 mm in width.

The present invention is designed to be a bit thicker than a standard business card to accommodate the non-volatile memory and the controlling unit. The flash memory device, in accordance with a preferred embodiment of the present invention, is designed from a plastic material with a thickness of typically 0.7-0.8 mm (as found in existing smart cards and credit cards). This thickness is smaller than that of a CD, and is therefore easier to carry in large quantities than prior art miniature CD disks containing digital data within a business card.

In accordance with another embodiment of the present invention, the flash memory device provides a large and fast memory containing large quantities of information of any sort.

In accordance with another embodiment of the present invention, the flash memory device is designed in an identical form factor of a standard 5 cm by 9 cm business card.

Figure 1:
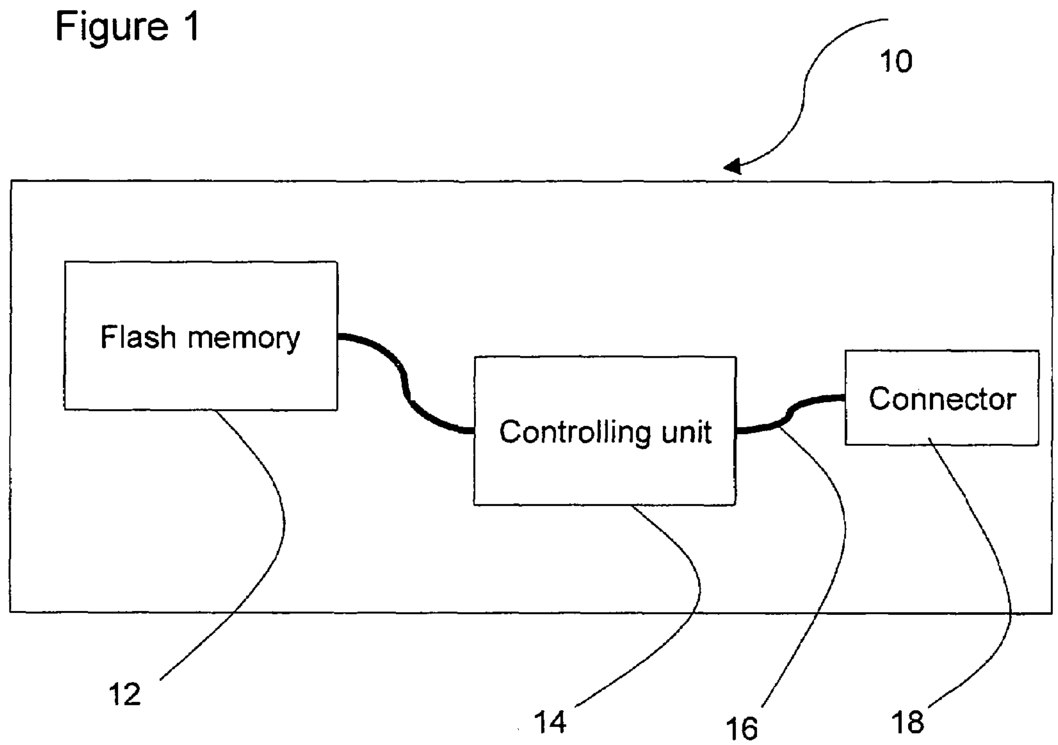
FIG. 1 shows a block diagram of the components comprising the flash memory device of the present invention, used as a business card.

Referring now to FIG. 1, there is shown a block diagram of the components of the flash memory device of the present invention, in a form factor of a business card 10. The flash memory device 10 includes a controlling unit 14 for controlling the write and read operations of the digital data stored within a non-volatile memory 12.

The controlling unit 14 is connected via an electrical connection 16 to a connector 18. Connector 18 is provided for operationally connecting the non-volatile memory to a host directly and interfacing with the operating system of the host. Thus, when the flash memory device 10 is connected to the host, the digital data may be displayed. Enabling technology for such a UFD is well-known in the art. See for example, U.S. Pat. No. 5,404,485 and U.S. Pat. No. 6,148,354 both to Ban, et al., both of which are incorporated by reference for all purposes as if fully set forth herein.

Figure 2A:
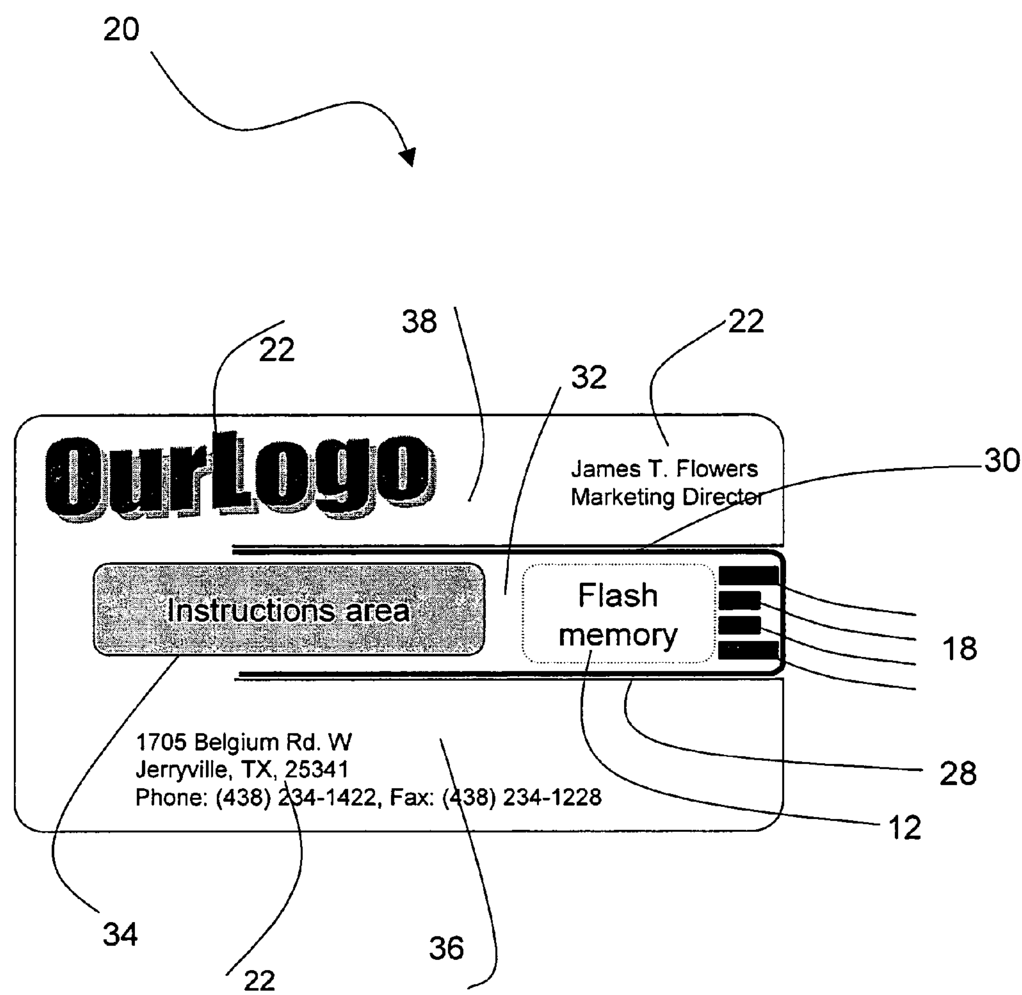
FIG. 2A is a top view of the flash memory device of the present invention.

Referring to FIG. 2A, there is shown a top view of the flash memory device of the present invention, in the form of a business card. The flash memory device 20 contains printed personal and business information 22 of the card owner (such as a name, address, title, logo, etc.), as printed on any typical business card.

The non-volatile memory 12, storing digital information relating to the card owner, is embedded within the business card 20. The non-volatile memory 12 is connected to the connector 18 that contains four USB connector leads in their standard size and spacing. An Instructions area 34 is a label containing promotional text or instructions of how to use the business card.

Two cuts, an upper cut 30 and a lower cut 28, are provided to enable a bending of the business card 20. The upper cut 30 and lower cut 28 enable bending an upper body part 38 and a lower body part 36, such that a tongue 32 being somewhat flexible is created between these two cuts 30, 28. As a result, the connector 18 is elevated above the rest of the business card for connecting to a standard USB socket.

Figure 2B:
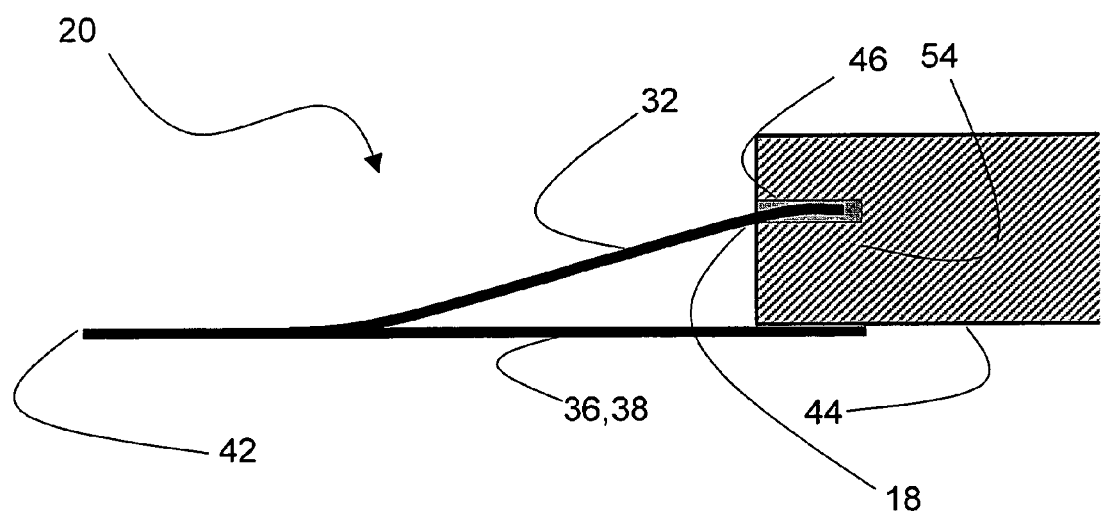
FIG. 2B is a side view of the flash memory device of the present invention.

Referring to FIG. 2B, there is shown a side view of the flash memory device 20 of the present invention. A user holds a rear part 42 of the business card, such that a connector 18 (see FIG. 1) of the business card is pushed into a USB socket 46 of a host 54. Tongue 32 (see FIG. 2A) of the business card is bent upward so that the connector 18 contacts the pins of the USB socket 46.

As the business card is resiliently flexible, the upper body part 38 and the lower body part 36, may rise up in the air to be realigned with the tongue 32 and weaken the electric contact. To prevent this, the upper body part 38 and the lower body part 36, of the business card are supported by a supporting part 44 of the host 54, thus maintaining the fixed position of the tongue 32 to push the connector 18 and contact the pins of the USB socket 46.

In case the pins of the USB socket 46 are inverted, facing up—the business card is inserted upside down, such that this time the upper body part 38 and the lower body part 36, are supported by the top part of the host 54 for the same purpose.

Figure 2C:
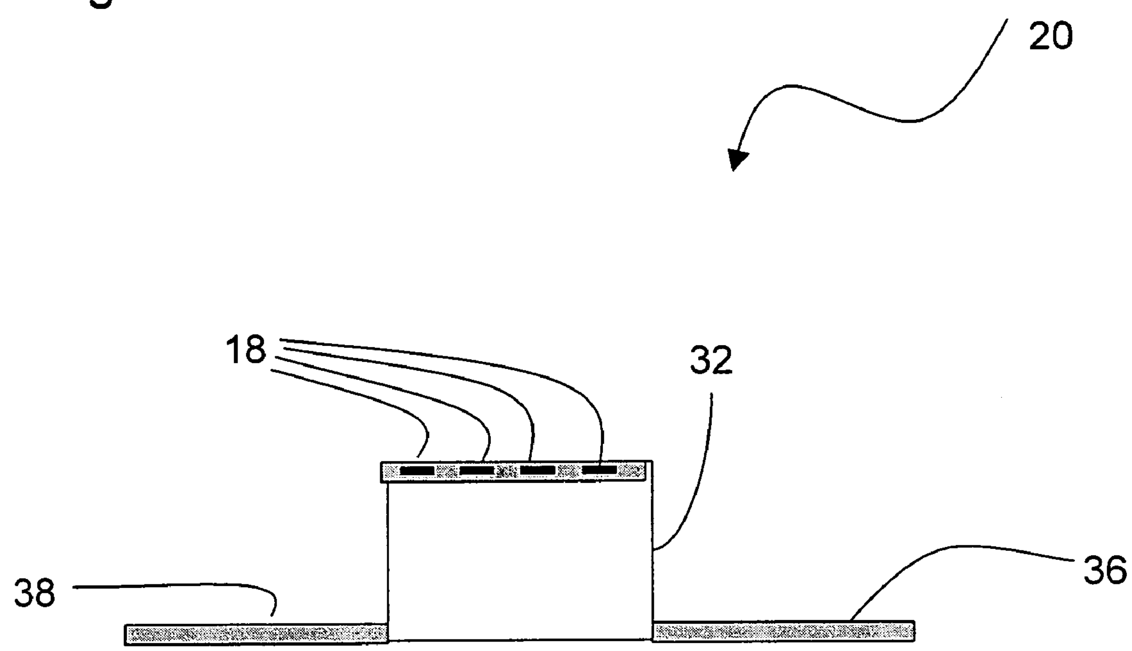
FIG. 2C is a front view of the flash memory device of the present invention, as seen from the direction of a host computing device of FIG. 2B.

Referring now to FIG. 2C, there is shown a front view of the flash memory device 20 of the present invention, as seen from the direction of the host 54 of FIG. 2B. The upper body part 38 and the lower body part 36 of the flash memory device 20 lean flat on either sides of the tongue 32. The tongue 32 is bent upwards, such that pins of the connector 18 (e.g. USB plug) of the flash memory device 20 are pressed upwards to contact pins of a socket of the host 54 (see FIG. 2B).

Another method of the present invention is a method of distributing personal information by storing the personal information in the non-volatile memory of the business card. Granting recipients limited access to such personal information by using standard encryption techniques known in the art is provided by the present invention as optional. The owner of the business card may grant an authorized recipient a decryption key to access all or part of the personal information stored on his business card. The delivery of the decryption key to a recipient does not have to be during the handout of the business card, and can be done later, upon request of the recipient and/or the consent of the owner.

It should be understood that the proposed storage device disclosed herein may employ any type of flash memory device, e.g. NAND-type flash memory device, etc. Furthermore, other implementations are possible within the scope of the invention, thus relating to any flash memory device used within a card having a form factor of a business card and providing similar functionalities.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A flash memory device comprising:

(a) a housing having a form factor of a business card bearing printed information;

(b) a non-volatile memory, within said housing, for storing digital information;

(c) a connecting mechanism, within said housing, for a direct operational connection of said non-volatile memory to a host, such that said digital information stored in said non-volatile memory is accessible to said host via said connecting mechanism; and (d) at least one slit located within said housing providing a substantially elastically bendable portion within said housing, wherein said elastically bendable portion includes said connecting mechanism.

2. The flash memory device of claim 1, wherein said substantially elastically bendable portion cooperates with a remainder of said housing to secure contact between said connecting mechanism and said host.

3. The flash memory device of claim 1, wherein said connecting mechanism is a USB connector.

4. The flash memory device of claim 1, wherein said non-volatile memory is a NAND flash memory.

5. A method for disseminating personal information, the method comprising the steps of:

(a) configuring a business card to include a non-volatile memory and a mechanism for directly operationally connecting said non-volatile memory to a host, said configuring including slitting said business card to form a substantially elastically bendable portion of said business card that includes at least a portion of said mechanism;

(b) printing a first portion of the personal information on a surface of said business card; and (c) storing a second portion of the personal information in said non-volatile memory to be accessible to said host upon said direct operational connection of said non-volatile memory to said host.

6. A flash memory device comprising:

(a) a housing having a form factor of a business card bearing printed information;

(b) a non-volatile memory, within said housing, for storing digital information; and (c) at least one slit located within said housing providing a substantially elastically bendable portion within said housing, wherein said elastically bendable portion includes a connecting mechanism for directly operationally connecting said non-volatile memory to a host, such that said digital information stored in said non-volatile memory is accessible to said host via said connecting mechanism.

7. The flash memory device of claim 6, wherein said substantially elastically bendable portion cooperates with a remainder of said housing to secure contact between said connecting mechanism and said host.

8. The flash memory device of claim 6, wherein said connecting mechanism is a USB connector.

9. The flash memory device of claim 6, wherein said non-volatile memory is a NAND flash memory.

10. A method for distributing personal information, the method comprising the steps of:

(a) printing a first portion of the personal information on a surface of a business card that includes a non-volatile memory;

(b) storing a second portion of the personal information in said non-volatile memory; and (c) slitting said business card to form a substantially elastically bendable portion of said business card for directly operationally connecting said non-volatile memory to a host, such that the personal information in said non-volatile memory is accessible to said host by operationally connecting said substantially elastically bendable portion directly to said host.

* * * * *

UNITED STATES PATENT AND TRADEMARK OFFICE

CERTIFICATE OF CORRECTION

PATENT NO. : 7,334,725 B2
APPLICATION NO. : 11/444385
DATED : February 26, 2008
INVENTOR(S) : Raz Dan It is certified that error appears in the above-identified patent and that said Letters Patent is hereby corrected as shown below:

Title page, item [73] Assignee:

“San Disk IL Ltd.” change to --SanDisk IL Ltd.--

Signed and Sealed this

Tenth Day of June, 2008

JON W. DUDAS

*Director of the United States Patent and Trademark Office*